(12) United States Patent
Nagai

(10) Patent No.: US 9,057,636 B2
(45) Date of Patent: Jun. 16, 2015

(54) SELF-CALIBRATING MECHANISM AND SELF-CALIBRATING METHOD FOR FLOW RATE SENSOR, AND DIAGNOSTIC MECHANISM AND DIAGNOSTIC METHOD FOR FLUID SENSOR

(71) Applicant: HORIBA STEC, Co., Ltd., Kyoto-shi, Kyoto (JP)

(72) Inventor: Kentaro Nagai, Kyoto (JP)

(73) Assignee: HORIBA STEC, Co. Ltd., Kyoto-shi (JP)

( * ) Notice: Subject to any disclaimer, the term of this patent is extended or adjusted under 35 U.S.C. 154(b) by 0 days.

(21) Appl. No.: 14/032,099

(22) Filed: Sep. 19, 2013

(65) Prior Publication Data
US 2014/0083159 A1   Mar. 27, 2014

(30) Foreign Application Priority Data

Sep. 21, 2012   (JP) ................................ 2012-207975
Sep. 21, 2012   (JP) ................................ 2012-207978

(51) Int. Cl.
| | |
|---|---|
| G01L 27/00 | (2006.01) |
| G01F 25/00 | (2006.01) |
| G01F 15/00 | (2006.01) |
| G05D 7/00 | (2006.01) |

(52) U.S. Cl.
CPC ........ *G01F 25/0007* (2013.01); *G01F 25/0053* (2013.01); *G01F 15/005* (2013.01); *G05D 7/00* (2013.01)

(58) Field of Classification Search
None
See application file for complete search history.

(56) References Cited

U.S. PATENT DOCUMENTS

| | | | |
|---|---|---|---|
| 2007/0233412 A1* | 10/2007 | Gotoh et al. .................. | 702/100 |
| 2008/0221822 A1* | 9/2008 | Laverdiere et al. ........... | 702/100 |
| 2010/0070240 A1 | 3/2010 | Yasuda et al. | |

FOREIGN PATENT DOCUMENTS

| | | |
|---|---|---|
| JP | WO2008053839 A1 | 5/2008 |
| JP | 4788920 B | 10/2011 |

* cited by examiner

*Primary Examiner* — Robert R Raevis
(74) *Attorney, Agent, or Firm* — Alleman Hall McCoy Russell & Tuttle LLP

(57) ABSTRACT

A valve fully closing part; a calibrating volume calculation part that calculates a calibrating volume on the basis value of an integration of a flow rate measured value outputted from a flow rate sensor in a fluid parameter changing interval; and a calibration part that calibrates a flow rate on the basis of the calculated calibrating volume and a preset reference volume are provided.

8 Claims, 14 Drawing Sheets

SELF-CALIBRATING MECHANISM AND SELF-CALIBRATING METHOD FOR FLOW RATE SENSOR, AND DIAGNOSTIC MECHANISM AND DIAGNOSTIC METHOD FOR FLUID SENSOR

TECHNICAL FIELD

This invention relates to a self-calibrating mechanism and self-calibrating method for performing self-calibration of, for example, a measured value outputted by a flow rate sensor. Also, the present invention relates to a diagnostic mechanism and diagnostic method for verifying or calibrating a measured value outputted by a fluid sensor such as a flow rate sensor or a pressure sensor.

BACKGROUND ART

In a semiconductor process, in order to introduce material gas or the like into a vacuum chamber at a constant flow rate, a flow rate controller such as a mass flow controller, and a pressure controller for introducing the material gas or the like into the vacuum chamber at a constant pressure are used.

For example, the flow rate controller is one that performs flow rate control so as to enable the material gas or the like to be introduced into the vacuum chamber at a desired flow rate by controlling an opening level of a flow rate control valve such that a measured value outputted from a flow rate sensor provided in a flow path through which fluid flows becomes equal to a preset flow rate value setting.

Meanwhile, in the case of using such a flow rate controller to continuously perform the flow rate control of the material gas, a flow rate error between the measured value of the flow rate sensor and a flow rate of fluid actually flowing may gradually increase because of, e.g., an influence of a component contained in the material gas, the attachment of contamination to a flow path in the flow rate controller or a measuring part of the flow rate sensor, or other reason.

Therefore, in order to prevent a large error from occurring in the flow rate control, a flow rate controller described in Patent Literature 1 is provided with a diagnostic mechanism for verifying whether or not an error between a measured value outputted by a flow rate sensor and an actual flow rate is sufficient to have an allowable degree of accuracy.

More specifically, the diagnostic mechanism is one that, on the basis of a change in flow rate of fluid that, in a state where a valve provided in a flow path is fully closed, flows out of a reference volume, which is a volume of a flow path space from the valve to the flow rate sensor, verifies the flow rate sensor. That is, first, as illustrated in a graph of FIG. 14, the diagnostic mechanism fully closes the valve, and from a mass flow rate integrated value throughout a fluid parameter changing interval in which a flow rate changes until a pressure of the fluid changes from a preset high pressure Ph to a low pressure Pl (a measured flow rate changes from 90% to 10%), and a gas state equation, the diagnostic mechanism calculates a diagnostic volume from which the fluid is considered to have flowed out. The diagnostic mechanism is configured to subsequently determine whether or not a difference between the calculated diagnostic volume and the preset reference volume is equal to or less than an allowable value, and in the case where a difference equal to or more than the allowable value appears, determine that the measured value outputted from the flow rate sensor has abnormality.

That is, as illustrated in FIG. 14, the conventional diagnostic mechanism collectively obtains the flow rate integrated value substantially throughout the fluid parameter changing interval to calculate the diagnostic volume after having fully closed the valve, and can therefore verify whether or not the measured value has abnormality throughout a measurement range.

Meanwhile, in the past, without separately using a flow rate sensor serving as a reference, on the basis of a diagnostic volume, it has been verified whether or not a measured value of a flow rate sensor as a verification target has abnormality; however, a specific technique has not been known regarding, in the case where there is abnormality, what sort of calibration should be performed on a measured value. For this reason, in the case where it is verified to be abnormal, some operation is performed, such as stopping a semiconductor manufacturing process to do maintenance work on the flow rate controller.

In recent years, it has been required to be able to obtain a reliable measured value from a flow rate sensor even without doing such maintenance, and eliminate wasted time for the above-described maintenance or the like. Accordingly, a technique for performing self-calibration on the basis of a measured value of the flow rate sensor without separately using a sensor serving as a reference, while keeping the flow rate sensor or the like in processing equipment, has been required.

On the other hand, Patent Literature 2 discloses a mass flow controller adapted to be able to calibrate a flow rate measured value outputted from a controlling flow rate sensor by providing, separately from the controlling flow rate sensor that outputs the measured value for flow rate control, the following: a reference pressure sensor that is not used for the flow rate control and serves as a comparison target, and a tank for storing fluid for the calibration.

In this mass flow controller, a value obtained by dividing a value, which is obtained by multiplying a differential pressure between respective pressures measured by the reference pressure sensor at time Tc when a valve is fully closed and Te when the flow rate becomes substantially constant by a volume V of the tank, by an integrated value of the flow rate measured by the controlling flow rate sensor between the time Tc and the time Te is set as a calibrating parameter A. Further, the mass flow controller calibrates the flow rate measured value of the controlling flow rate sensor on the basis of a ratio between a calibrating parameter Ai at the normal time and a calibrating parameter Af calculated with use of a current measured value.

However, although a technique of Patent Literature 2 enables the controlling flow rate sensor to be calibrated, the reference pressure sensor and the tank, which are completely irrelevant to the flow rate control that is an original function of the mass flow controller, should be provided, and therefore the mass flow controller is increased in size, which makes the mass flow controller awkward to use in a semiconductor manufacturing process in which a footprint should be made as small as possible. Also, a complicated operational expression as described above is used, and also the calibration is performed on the basis of a plurality of measured values, so that an influence of an unexpected error component included in a measured value is likely to appear in the calibration, and therefore it is difficult to obtain desired calibration accuracy.

As a result of extensive examination of such technical problems by the present inventor, in the past, it has been considered that even in the case of using the diagnostic volume calculated from the integrated value of a measured value in the fluid parameter changing interval as disclosed in Patent Literature 1, although it can be verified whether or not the flow rate sensor has abnormality, it is impossible to use the diagnostic volume to perform calibration so as to output a correct measured value from the flow rate sensor; however, the present inventor has first found that the diagnostic volume calculated on the basis of the integrated value of the flow rate measured in the fluid parameter changing interval can actually be used to perform the calibration.

In other words, as a result of study, the present inventor has found that the diagnostic volume that is calculated from the flow rate integrated value in the fluid parameter changing interval and has been considered to be used only for verification has a relationship with the magnitude of an error between the measured value outputted from the flow rate sensor and a true flow rate and also has a value usable for the calibration.

Also, as illustrated in FIG. 14, after having fully closed the valve, the conventional diagnostic mechanism collectively obtains the flow rate integrated values substantially throughout the fluid parameter changing interval to calculate the diagnostic volume, and therefore although being able to make an evaluation throughout the measurement range of the flow rate sensor, cannot verify which measurement interval range causes an unallowable measurement error to occur in a measured value. In addition, which measurement interval of the flow rate sensor causes what level of flow rate error to occur cannot be quantitatively known, so that, for example, only an offset correction can be made throughout the measurement range, and therefore it is difficult to improve measurement accuracy by performing finer calibration.

CITATION LIST

Patent Literature

Patent Literature 1: International Publication No. 2008/053839
Patent Literature 2: Japanese Patent No. 4788920

SUMMARY OF INVENTION

Technical Problem

In consideration of the problems as described above, the present invention is made on the basis of the fact first found by the present inventor, and provides a self-calibrating mechanism and self-calibrating method that, even without separately providing a fluid sensor serving as a reference, enable self-calibration with use of a value obtained from a fluid sensor provided in a flow path.

Also, the present invention is made in consideration of the problems as described above, and provides a diagnostic mechanism and diagnostic method that can quantitatively verify what level of flow rate error or pressure error occurs in each interval of a measurement range of a fluid sensor, and consequently on the basis of a result of the verification or the like, perform calibration corresponding to a flow rate error or pressure error in each interval of the measurement range to realize the fluid sensor having high accuracy throughout the measurement range.

Solution to Problem

That is, a self-calibrating mechanism of the present invention is a self-calibrating mechanism that, on a basis of a measured value of a flow rate sensor that measures a flow rate of fluid flowing through a flow path, performs self-calibration of a measured value of the flow rate sensor, and provided with: a valve fully closing part that outputs a fully closing command for fully closing a valve provided in the flow path; a calibrating volume calculation part that calculates a calibrating volume on a basis of an integrated value of flow rate measured by the flow rate sensor in at least a partial interval of a fluid parameter changing interval in which the valve is in a state of being kept in a fully closed state or in a state of being changed from the fully closed state to an opened state, and the flow rate of the fluid flowing through the flow path changes with time; and a calibration part that, on a basis of the calibrating volume calculated in the calibrating volume calculation part, and a preset reference volume, calculates a calibration factor for performing the self-calibration of the measured value of the flow rate sensor.

Also, a self-calibrating method of the present invention is a self-calibrating method that, on a basis of a measured value of a flow rate sensor that measures a flow rate of fluid flowing through a flow path, performs self-calibration of a measured value of the flow rate sensor, and provided with: a valve fully closing step of outputting a fully closing command for fully closing a valve provided in the flow path; a calibrating volume calculation step of calculating a calibrating volume on a basis of at an integrated value of at least one flow rate measured by the flow rate sensor in at least a partial interval of a fluid parameter changing interval in which the valve is in a state of being kept in a fully closed state or in a state of being changed from the fully closed state to an opened state, and the flow rate of the fluid flowing through the flow path changes with time; and a calibration step of, on a basis of the calibrating volume calculated in the calibrating volume calculation step, and a preset reference volume, calculating a calibration factor for performing the self-calibration of the measured value of the flow rate sensor.

Note that the valve to be fully closed by the valve fully closing part may be any device as long as the device is a valve provided in the flow path, and may be a valve such as an on/off valve, or a flow rate control valve or pressure control valve of which an opening level can be freely regulated. Also, the flow rate refers to a concept including both of a mass flow rate and a volumetric flow rate. In addition, the self-calibration is one having a concept of, with use of a measured value outputted from a sensor as a calibration target, calibrating the sensor itself, and refers to performing calibration without using another sensor serving as a reference as, for example, in Patent Literature 2.

Also, the present invention is based on the fact first found as a result of intensive examination by the present inventor that a calibrating volume that has been, in the past, considered to be used only to verify whether or not abnormality is present and is calculated from an integrated value of a flow rate measured in a fluid parameter changing interval can be actually used to calculate a calibration factor.

If so, on the basis of the calibrating volume calculated from the flow rate integrated value of the measured value outputted from the flow rate sensor as a calibration target, and the preset reference volume, the calibration part calculates the calibration factor, and therefore even without separately providing a sensor or the like serving as a reference, the self-calibration can be performed. In addition, the calibrating volume is calculated from the integrated value of the measured value of the flow rate sensor, so that, for example, even in the case where some sort of unexpected noise or the like is superimposed on a measured value, the influence of the noise can be reduced by an averaging effect, and therefore calibration accuracy using the calculated calibration factor can be made very high.

Specific aspects of each of the calibration coefficients, which enable a measured value to be calibrated on the basis of a corresponding calibrating volume and the reference volume with high accuracy without the need for a complicated operation include one in which the calibration factor has a value by which a measured value of the flow rate outputted by the flow rate sensor is to be multiplied, and is obtained by dividing the reference volume by the calibrating volume. If so, to calculate the calibration factor, many operations are not required, and therefore an influence of an unexpected error, which may be superimposed on the measured value, can be prevented from being amplified by the operations. Accordingly, the calibration accuracy can also be increased.

To accurately and simply calculate the reference volume necessary to calculate the calibration factors, it is only necessary that the reference volume is a calibrating volume that is calculated in the calibrating volume calculation part at a normal time. Note that, as the reference volume, in the case of being able to calculate, from a design value or the like, a flow path volume from a point where the valve is closed in the flow path to a point where the flow rate sensor as a calibration target is provided, a value of the flow path volume may be used. Also, as will be described later, in the case of dividing the fluid parameter changing interval into a plurality of calibration intervals to perform calibration for each of the calibration intervals, a calibrating volume calculated for each of the calibration intervals always takes the same value in a normal case, and therefore it is only necessary to prepare only one reference volume.

Not to uniformly make an offset correction throughout a measurement range, but to enable, even in the case where an error of a measured value is different in each interval of the measurement range, the self-calibration to be performed so as to meet a mode of the error, and consequently errors throughout the measurement range to be made equal to a substantially constant value within an allowable flow rate accuracy range, it is only necessary that the calibrating volume calculation part is configured to divide the fluid parameter changing interval into a plurality of calibration intervals and calculate each of the calibrating volumes for the respective calibration intervals and a calibrating volume for each of the calibration intervals, and that the calibration part is configured to calculate each of the calibration factors for the respective calibration intervals.

To divide the fluid parameter changing interval into a plurality of calibration intervals so as to enable the self-calibration of a measured value to be performed with high accuracy for each of the calibration intervals, it is only necessary that the calibrating volume calculation part is configured to divide the fluid parameter changing interval into a plurality of calibration intervals and calculate each of the calibrating volumes for the respective calibration intervals, and that a starting point and an ending point of each of the calibration intervals are set on a basis of a measured value of the flow rate outputted from the flow rate sensor.

To enable an influence of noise or the like superimposed on a measured value outputted from the flow rate sensor in each of the calibration intervals to be reduced, and also the reference volume, which is a comparison target for the calibrating volumes, to be shared by all of the calibration intervals, it is only necessary that the calibrating volumes are calibrating volumes that are, for the respective calculation intervals, calculated on the basis of the integrated values of the flow rates of the fluid flowing through the flow path, and the reference volume is a preset reference volume, and a calibrating volume that is calculated by the calibrating volume calculation part when the flow rate sensor is normal.

A mass flow controller provided with the self-calibrating mechanism of the present invention is configured to calculate a calibration factor on the basis of a calibrating volume calculated from a corresponding flow rate integrated value of the flow rate sensor, and therefore without separately preparing a calibrating flow rate sensor for the mounted flow rate sensor, the self-calibration can be performed with high accuracy.

Accordingly, without detaching the mass flow controller provided for semiconductor processing, the self-calibration can be performed in the middle of the process to keep flow rate control accuracy at high accuracy over a long period of time.

Also, a diagnostic mechanism of the present invention is a diagnostic mechanism that verifies or calibrates a measured value of a fluid sensor that measures a flow rate or a pressure of fluid flowing through a flow path, and provided with: a valve fully closing part that outputs a fully closing signal for fully closing a valve provided in the flow path; a diagnostic parameter calculation part that divides, into a plurality of diagnostic intervals, a fluid parameter changing interval in which the valve is in a state of being kept in a fully closed state or in a state of being changed from the fully closed state to an opened state, and the flow rate or the pressure of the fluid flowing through the flow path changes with time, and also, on a basis of a flow rate or pressure measured value outputted from the fluid sensor in each of the diagnostic intervals, calculates each of diagnostic parameters for the respective diagnostic intervals; and a diagnostic part that, on a basis of each of the diagnostic parameters calculated for the respective diagnostic intervals and at least one preset reference parameter, verifies or calibrates the flow rate or pressure measured value outputted by the fluid sensor in the diagnostic interval.

Further, a diagnostic method of the present invention is a diagnostic method that verifies or calibrates a measured value of a fluid sensor that measures a flow rate or a pressure of fluid flowing through a flow path, and provided with: a valve fully closing step of outputting a fully closing signal for fully closing a valve provided in the flow path; a diagnostic parameter calculation step of dividing, into a plurality of diagnostic intervals, a fluid parameter changing interval in which the valve is in a state of being kept in a fully closed state or in a state of being changed from the fully closed state to an opened state, and the flow rate or the pressure of the fluid flowing through the flow path changes with time, and also on a basis of a flow rate or pressure measured value outputted from the fluid sensor in each of the diagnostic intervals, calculating each of diagnostic parameters for the respective diagnostic intervals; and a diagnostic step of, on a basis of each of the diagnostic parameter calculated for the respective diagnostic intervals and at least one preset reference parameter, verifying or calibrating the flow rate or pressure measured value outputted by the fluid sensor in the diagnostic interval.

Note that the valve to be fully closed by the valve fully closing part may be any device as long as the device is a valve provided in the flow path, and may be a valve such as an on/off valve, or a flow rate control valve or pressure control valve of which an opening level can be freely regulated. Also, the flow rate refers to a concept including both of a mass flow rate and a volumetric flow rate.

If so, the diagnostic parameter calculation part is configured to divide the fluid parameter changing interval into the plurality of diagnostic intervals, and then, on the basis of a flow rate or pressure measured value outputted from the fluid sensor in each of the diagnostic intervals, calculate a diagnostic parameter for the diagnostic interval, and therefore, regarding the flow rate sensor, it becomes possible to verify whether or not a measured value in each of the diagnostic intervals is within an allowable range, or calibrate a measured value in a different mode for each of the diagnostic intervals.

That is, substantially through a measurement range of the fluid sensor, not a uniform determination, but the verification or calibration of a measured value can be performed for each of the intervals, so that a finer correction of a measured value becomes possible, and therefore, throughout the measurement range, a flow rate error or pressure error can be made to fall within the allowable accuracy range and also to have a very small value.

To divide the fluid parameter changing interval into the plurality of diagnostic intervals so as to enable the verification or calibration of a measured value to be performed with high accuracy for each of the diagnostic intervals, it is only necessary that a starting point and an ending point of each of the diagnostic intervals are set on a basis of flow rate or pressure measured values outputted from the fluid sensor.

To enable an influence of noise or the like superimposed on a measured value outputted from the fluid sensor in each of the calibration interval to be reduced, and also the reference parameter, which is a comparison target for the diagnostic parameter, to be shared by the respective diagnostic intervals, it is only necessary that each of the diagnostic parameters is a diagnostic volume that is, for the respective diagnostic intervals, calculated on a basis of an integrated value of the flow rate of the fluid flowing through the flow path and that the reference parameter is a preset reference volume and the at least one reference volume is a diagnostic volume that is calculated by the diagnostic parameter calculation part when the fluid sensor is normal. If so, each of calibrating volumes calculated for each of the calibration intervals always takes the same value in a normal case, and therefore it is only necessary to prepare only one reference volume.

To enable the fluid sensor to be verified or calibrated only with the output of a measured value from the fluid sensor as a verification or calibration target, it is only necessary that each of the diagnostic parameters are each of diagnostic period lengths, which are period lengths of the respective diagnostic intervals, calculated on a basis of a starting point and an ending point of the respective diagnostic intervals and the at least one reference parameter is each of reference period lengths, which are preset for the respective diagnostic intervals, and each of the reference period lengths are each of diagnostic period lengths, which are calculated for the respective diagnostic intervals by the diagnostic parameter calculation part when the fluid sensor is normal.

Specific configurations for making it possible to clarify which of the diagnostic intervals causes a problem in a measured value include one in which the diagnostic part is configured to compare each of the diagnostic parameters and at least one reference parameter with each other for each of the diagnostic intervals, and verify which diagnostic interval causes a measured value outputted from the fluid sensor to have abnormality.

In order to perform the calibration depending on an error amount for each of the diagnostic intervals so as to make a flow rate error or pressure error fall within the allowable accuracy range throughout the measurement range of the fluid sensor, it is only necessary that the diagnostic part is configured to calculate each of the calibration factors on a basis of each of the diagnostic parameters and the at least one reference parameter for the respective diagnostic intervals.

A mass flow controller provided with the diagnostic mechanism of the present invention enables self-verification or self-calibration without separately preparing a fluid sensor for verification or calibration for the mounted fluid sensor. Accordingly, without detaching the mass flow controller provided for a semiconductor process, the self-calibration can be performed in the middle of the process to keep flow rate control accuracy at high accuracy over a long period of time.

Advantageous Effects of Invention

As described above, according to the self-calibrating mechanism and self-calibrating method of the present invention, a novel self-calibrating technique found by the present inventor enables, without separately using a sensor serving as a reference, a measured value of a flow rate sensor to be calibrated with high accuracy in a semiconductor manufacturing process.

Also, according to the diagnostic mechanism and diagnostic method of the present invention, the diagnostic parameter calculation part is configured to divide the fluid parameter changing interval in which the flow rate or pressure changes after the valve has been fully closed into the plurality of diagnostic intervals, and then calculate a diagnostic parameter for each of the diagnostic intervals, and therefore it can be known which diagnostic interval causes what sort of measurement error of the fluid sensor. Accordingly, a measured value of the fluid sensor can be verified or calibrated independently for each of the diagnostic intervals, and, as a result, the calibration can be performed such that a flow rate or pressure error occurs only within the allowable accuracy range throughout the measurement range of the fluid sensor.

REFERENCE CHARACTERS LIST

Figure 1:
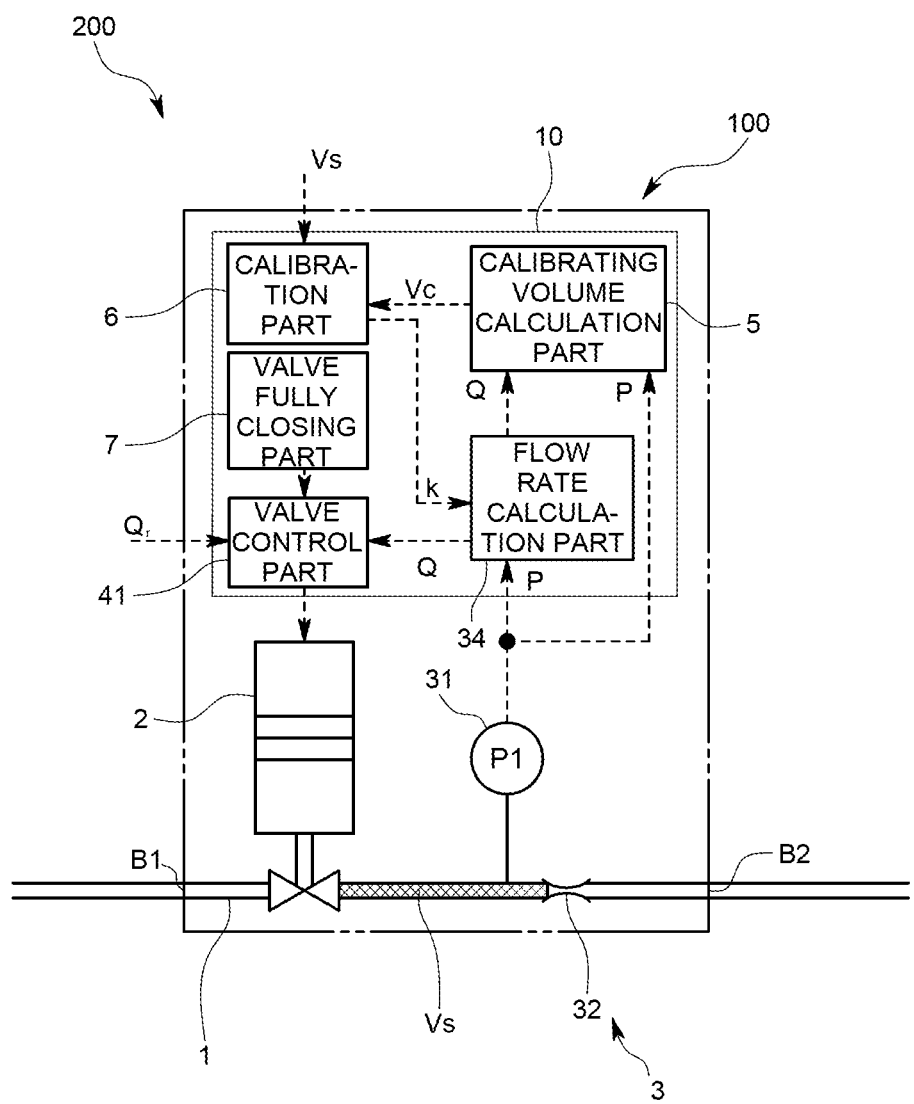
FIG. 1 is a schematic fluid circuit and functional block diagram of a mass flow controller provided with a calibrating mechanism according to a first embodiment of the present invention.

200: Flow rate controller
300: Pressure controller
100: Self-calibrating mechanism
1: Flow path
2: Flow rate control valve (pressure control valve)
21: On/off valve
3: Flow rate sensor
34: Flow rate calculation part
5: Calibrating volume calculation part
6: Calibration part
7: Valve fully closing part
10: Information processing circuit
41: Valve control part
B: Board block
B1: Introduction port
B2: Lead-out port
BP1: Main attachment surface
BP2: Sub attachment surface
BT: Reference tank
C: Casing
Vc: Calibrating volume
Vs: Reference volume
k: Calibration factor
$\Delta t$: Diagnostic interval length
$\Delta t_s$: Reference interval length

DESCRIPTION OF EMBODIMENTS

A self-calibrating mechanism (diagnostic mechanism) 100 according to a first embodiment of the present invention and a flow rate controller 200 provided with the self-calibrating mechanism 100 will be described with reference to FIGS. 1 to 5.

The flow rate controller 200 of the first embodiment is a mass flow controller that is used, for example, in a semiconductor process, to supply material gas containing a substance, which is to be evaporated onto a substrate, into a vacuum chamber at a predetermined flow rate.

The flow rate controller 200 is one that is to be attached to a gas panel system connected to the above-described vacuum chamber, and, in one package, has fluid devices for flow rate control and an information processing circuit 10 that performs various types of control. That is, the flow rate controller 200 is one that is formed into a module so as to realize a flow rate control function only by connecting the flow rate control unit to pipes, a connecting block, or the like.

The flow rate controller 200 is, as illustrated in FIG. 1, provided with respective parts so as to fulfill functions as: a flow rate control mechanism for flowing fluid that flows through a flow path 1 at a desired flow rate and the self-calibrating mechanism 100 for verifying whether or not an error between a flow rate measured value Q measured in the flow rate control unit and a flow rate value of the fluid actually flowing through the flow path 1 is within an allowable range and also for performing calibration.

First, a hardware configuration will be described mainly with reference to FIG. 2.

Figure 2:
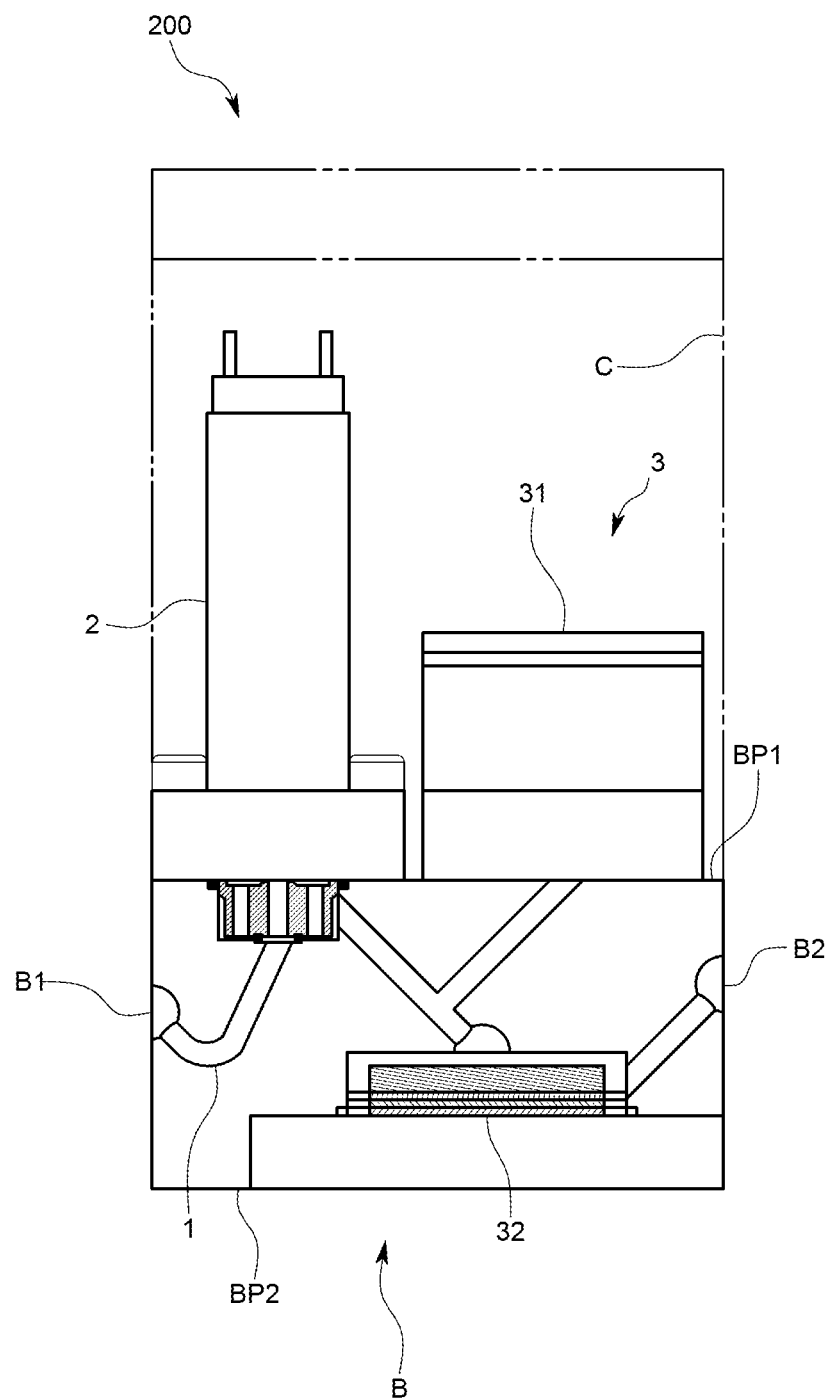
FIG. 2 is a schematic cross-sectional view illustrating internal structure of the mass flow controller of the first embodiment.

The flow rate controller 200, as illustrated in a cross-sectional view of FIG. 2, is one that is provided with: a substantially rectangular parallelepiped shaped board block B that internally has the flow path 1 formed between an introduction port B1 and a lead-out port B2, through which the fluid flows; a flow rate control valve 2 and pressure sensor 31 as the fluid devices that are attached side by side in a longer direction on a main attachment surface BP1 that is an upper surface of the board block B; a fluid resistor 32 that is attached on a sub attachment surface BP2 that is a lower surface of the board block B; the information processing circuit 10 that performs various types of operations for fulfilling the functions as the flow rate control mechanism and self-calibrating mechanism 100; and a casing C that is attached so as to cover outsides of such members.

Regarding the board block B, the introduction port B1 is formed on one end surface thereof; the lead-out port B2 is formed on the other end surface thereof; and the flow path 1 is formed inside thereof so as to travel in the longer direction while moving up and down between the main attachment surface BP1 and the sub attachment surface BP2. As can be seen from the cross-sectional view of FIG. 2, the flow path 1 formed inside is, from an upstream side, sequentially provided with the flow rate control valve 2, pressure sensor 31, and fluid resistor 32 in this order.

The flow rate control valve 2 is one that can appropriately change an opening level between a valve seat and a valve element by a piezo element according to an applied voltage. The voltage applied to the flow rate control valve 2 is appropriately changed by a valve control part 41, discussed below.

The pressure sensor 31 is one that is intended to measure a pressure on an upstream side of the fluid resistor 32, and the measured pressure is used to calculate the flow rate of the fluid flowing through the flow path 1. In addition, the measured pressure value P measured by the pressure sensor 31 is also used in the self-calibrating mechanism 100, discussed below, to verify and calibrate the flow rate measured value Q.

The fluid resistor 32 is, for example, a laminar flow element formed by stacking rectangular-shaped thin plates each of which is formed such that a minute flow path penetrates between opposite face plate parts, and fixed with being fitted into a concave part present on the sub attachment surface BP2 and pressed against the board block B by a retainer plate. In addition, as the fluid resistor 32, in addition to the laminar flow element, any element that causes a pressure difference between the upstream and downstream sides is also possible, such as a sonic nozzle.

Next, a software configuration will be described with reference to FIG. 1.

The information processing circuit 10 is one that is contained in an upper space of the casing C, and physically includes a CPU, a memory, an I/O channel, an A/D converter, a D/A converted, and other analog or digital electric circuit, and the CPU and the other peripheral devices cooperatively operate according to a program stored in the memory, whereby the information processing circuit 10 is configured to carry functions as at least a flow rate calculation part 34, valve control part 41, valve fully closing part 7, calibrating volume calculation part (diagnostic parameter calculation part) 5, and calibration part (diagnostic part) 6.

First, parts that are related to the operations as the flow rate control mechanism will be described.

The flow rate calculation part 34 is one that, on the basis of the pressure measured by the pressure sensor 31 and a pressure on the downstream side of the fluid resistor 32, calculates a mass or volumetric flow rate of the fluid flowing through the flow path 1. Note that the flow rate controller 200 of the first embodiment is, on the downstream side of the fluid resistor 32, not provided with means adapted to sense the pressure;

however, in the first embodiment, the downstream side is connected with a vacuum chamber, and therefore the pressure on the downstream side of the fluid resistor 32 can be treated as substantially zero, or as a very small value as compared with the pressure measured on the upstream side of the fluid resistor 32. For this reason, the flow rate calculation part 34 is configured to calculate the flow rate of the fluid flowing through the flow path 1 in a form that ignores a downstream side pressure in an expression such as the Bernoulli equation or the Hagen-Poiseuille equation. In addition, the pressure sensor 31, fluid resistor 32, and flow rate calculation part 34 cooperatively operate to thereby fulfill a function as a flow rate sensor 3. Note that, in this specification, a fluid sensor is a term collectively referring to a flow rate sensor for measuring a flow rate and a pressure sensor for measuring a pressure. Accordingly, in the first embodiment, the flow rate sensor 3 refers to, of the fluid sensor, one that measures a flow rate.

The valve control part 41 is one that performs feedback control of the opening level of the flow rate control valve 2 so as to minimize a deviation between the flow rate measured value Q of the fluid flowing through the flow path 1, which is outputted by the flow rate calculation part 34, and a flow rate value setting Qr set by a user. For example, the valve control part 41 is adapted to, by PID control or the like, perform the flow rate control so as to keep the flow rate of the fluid flowing through the flow path 1 constant at the flow rate value setting Qr. Further, the valve control part 41 is also configured to, in the case of receiving a command from the valve fully closing part 7, discussed below, forcibly fully close the flow rate control valve 2 in priority to another command such as the flow rate value setting Qr.

Next, parts that are related to the functions as the self-calibrating mechanism 100 will be described.

The valve fully closing part 7 is one that, to start self-calibration of the flow rate controller 200, outputs a fully closing command for fully closing the flow rate control valve 2 provided in the flow path 1 to the valve control part 41. The first embodiment is adapted such that, during obtaining a measured value necessary for the calibration, to prevent the fluid from newly flowing into a reference volume Vs from the upstream side, the valve fully closing part 7 operates so as to keep the flow rate control valve 2 in a fully closed state. Note that the fully closing command refers to a command for inputting a value of 0% to the valve control part 41 as the flow rate value setting Qr or a separately set command for full closing. Also, the fully closed state is a state where the fluid does not substantially pass through the valve, and refers to a concept also including a state such as a state where a very small amount of fluid leaks out.

The calibrating volume calculation part 5 is configured to divide, into a plurality of calibration intervals (diagnostic intervals), a fluid parameter changing interval in which the valve is in the fully closed state and the flow rate or pressure of the fluid flowing through the flow path 1 changes with time, and also on the basis of a flow rate or pressure measured value outputted from the flow rate sensor 3 in each of the calibration intervals, calculate a calibrating volume (diagnostic volume) in the calibration interval.

Figure 3:
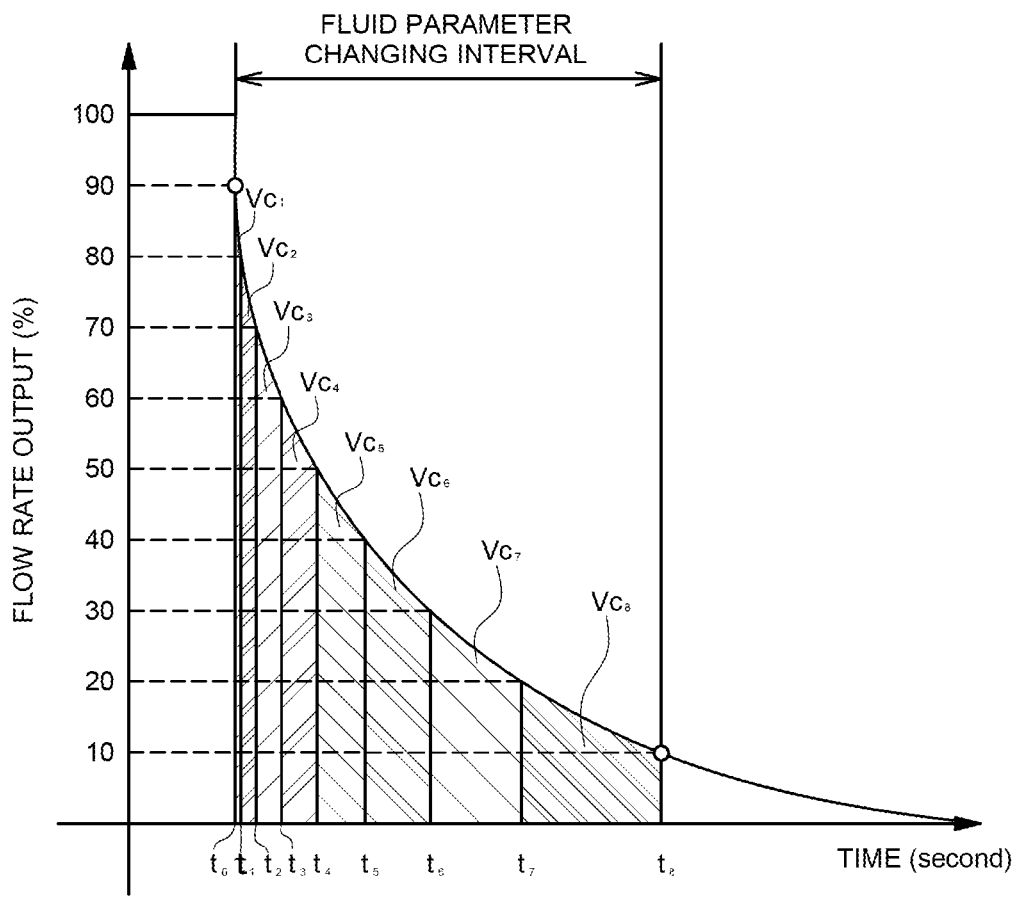
FIG. 3 is a schematic graph illustrating a mode in which a calibrating volume calculation part of the first embodiment divides a fluid parameter changing interval into a plurality of calibration intervals.

As illustrated in FIG. 3, the calibrating volume calculation part 5 is configured to, not on the basis of an elapsed time after the self-calibration has been started, but on the basis of flow rate measured values Q outputted from the flow rate sensor 3, set starting and ending points of each of the calibration intervals. That is, in the first embodiment, the calibrating volume calculation part 5 is configured to equally divide a measurement range of the flow rate sensor on a 10% interval basis, and at a point of time when a relevant measured flow rate value is reached, start or end a corresponding calibration interval. More specifically, the calibrating volume calculation part 5 divides the fluid parameter changing interval into 8 intervals in which a measured flow rate value covers 90 to 80%, 80 to 70%, 70 to 60%, 60 to 50%, 50 to 40%, 40 to 30%, 30 to 20%, and 20 to 10%, and determines time at an end point of each of the intervals as time $t_i$ at a starting or ending point of the calibration interval.

Further, the calibrating volume calculation part 5 calculates a calibrating volume Vc that is calculated on the basis of an integrated value of a flow rate of the fluid flowing through the flow path 1 in each of the plurality of calibration interval into which the fluid parameter changing interval is divided.

The calibrating volume Vc is calculated on the basis of changes in flow rate and pressure of the fluid flowing out of the reference volume Vs of the flow path 1 between the fully closed flow rate control valve 2 and the fluid resistor 32 of the flow rate sensor 3 as illustrated in FIG. 1.

More specifically, the calibrating volume calculation part 5 is configured to, with use of a gas state equation, on the basis of a flow rate integrated value that is a total flow rate of the fluid flowing out in each of the calibration intervals, pressure values at starting and ending points of the calibration interval, and temperatures of the fluid at the starting and ending points of the calibration interval, back-calculate a calibrating volume Vc by using the fact that the volume of a closed space where the fluid having flowed out in a previous or following state was present does not change.

That is, the ideal gas state equation may be described as the following expression (1):

[Expression 1]

$$\frac{PV}{T} = nR \quad (1)$$

where V is a volume of gas, P is a pressure of the gas, n is a molar number, R is the gas constant, and T is a temperature of the gas.

Further, by setting up gas state equations in states at starting and ending points of each of the calibration intervals with respect to the reference volume Vs, the expression (2) is derived on the basis of the expression (1):

[Expression 2]

$$\frac{P_i V_S}{T_i} - \frac{P_{i-1} V_S}{T_{i-1}} = (n_i - n_{i-1})R \quad (2)$$

$$V_S = \frac{(n_i - n_{i-1})R}{\frac{P_i}{T_i} - \frac{P_{i-1}}{T_{i-1}}}$$

where i is a subscript indicating an identification number of the calibration interval from a high pressure side.

Still further, a difference in molar number can be reduced from the total flow rate of the gas flowing out of the reference volume Vs from the starting point to the ending point. Accordingly, by appropriately setting the gas constant as a value including properties specific to the gas, such as a molecular weight of the gas, the expression (2) can be rewritten as the expression (3):

[Expression 3]

$$Vc_i = \frac{R \int_{t_{i-1}}^{t_i} (-Q) dt}{\frac{P_i}{T_i} - \frac{P_{i-1}}{T_{i-1}}} \quad (3)$$

where $Vc_i$ is a calibrating volume Vc calculated for the calibration interval, $t_i$ is time at the ending point of the calibration interval, $t_{i-1}$ is time at the starting point of the calibration interval, and Q is a mass flow rate measured value Q outputted from the flow rate sensor 3. Also, the temperature represents a measured value outputted from an unillustrated temperature sensor. Note that in the case where a rapid change does not occur, the temperature may be treated as taking a constant value.

The calibration part 6 is configured to calibrate a flow rate measured value outputted by the flow rate sensor in the calibration interval on the basis of a calibrating volume Vc calculated for each of the calibration intervals calculated by the calibrating volume calculation part 5, and the preset reference volume Vs.

In the first embodiment, the calibrating volume Vc and reference volume Vs are calculated by the same technique on the basis of the above-described expressions (1) to (3). More specifically, the reference volume Vs is calculated by using any of calibrating volumes Vc respectively calculated for the calibration intervals calculated by the calibrating volume calculation part 5 at a normal time of the flow rate sensor 3, or an average value of the calibrating volumes Vc. Note that the normal time refers to the case where an error between an actual flow rate value and a measured vale is substantially absent, or a value at the time of factory shipment. As is clear from the above description, in the first embodiment, the calibrating volumes Vc are respectively calculated separately for the corresponding calibration intervals; however, regarding the reference volume Vs, the calibration part 6 uses one value for the respective calibration intervals in common. As a variation, the calibrating volumes Vc calculated for the respective calibration intervals at the normal time may be used as different reference volumes Vs. Also, values of the reference volumes Vs may be calculated on the basis of design values of a pipe diameter and length of the flow path 1, arrangement of the flow rate control valve 2 and the fluid resistor 32, and the like at the time of designing the flow rate controller 200.

The case where the calibration part 6 verifies the flow rate sensor 3 will now be described.

The calibration part 6 is configured to compare a calibrating volume Vc and the reference volume Vs with each other for each of the calibration intervals, and verify which calibration interval causes abnormality in a measured value outputted from the fluid sensor 3. More specifically, the calibration part 6 is configured to obtain a difference between a calibrating volume Vc in each of the calibration intervals and the reference volume Vs, and determine that a measured value in a calibration interval in which an absolute value of the difference is equal to or more than a predetermined value has abnormality. Note that the present invention may be adapted to verify a measured value for each of the calibration intervals on the basis of not only the difference but whether a value of a ratio is equal to or more than a predetermined value in terms of the comparison between a calibrating volume Vc and the reference volume Vs.

Next, the case where the calibration part 6 calibrates the flow rate sensor 3 will now be described.

The calibration part 6 is configured to calculate a calibration factor k for each of the calibration intervals on the basis of a calibrating volume Vc and the reference volume Vs. That is, the calibration part 6 is configured to calculate a value obtained by dividing the reference volume Vs by a calibrating volume Vc for each of the calibration intervals as a calibration factor k, and output the calibration factor k to the flow rate calculation part 34.

The flow rate calculation part 34 multiplies a measured value by the calibration factor k, which is inputted from the calibration part 6 after the completion of the self-calibration, to output the resultant value as a post-calibration measured value. That is, the flow rate calculation part 34 determines which calibration interval a calculated measured value is a value belonging to, and, as represented by the expression (4), multiplies the measured value by a calibration factor k=Vs/$Vc_i$ corresponding to the relevant calibration interval to set a resultant value as a post-calibration measured value.

[Expression 4]

$$f' = \frac{Vs}{Vc_i} f \quad (4)$$

where f is the pre-calibration measured value, f' is the post-calibration measured value, Vs is the reference volume, and Vci is the calibrating volume calculated for the relevant calibration interval.

Figure 4:
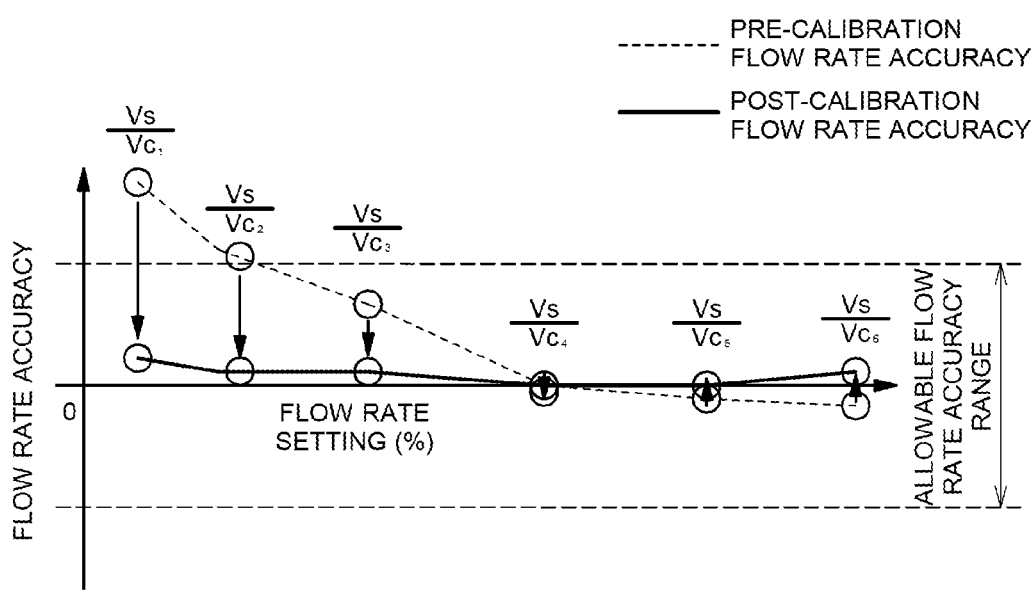
FIG. 4 is a schematic graph illustrating a change in flow rate error in the case of calibrating a measured value by multiplying a calibration factor calculated for each of the calibration intervals by the calibrating volume calculation part of the first embodiment.
Figure 5:
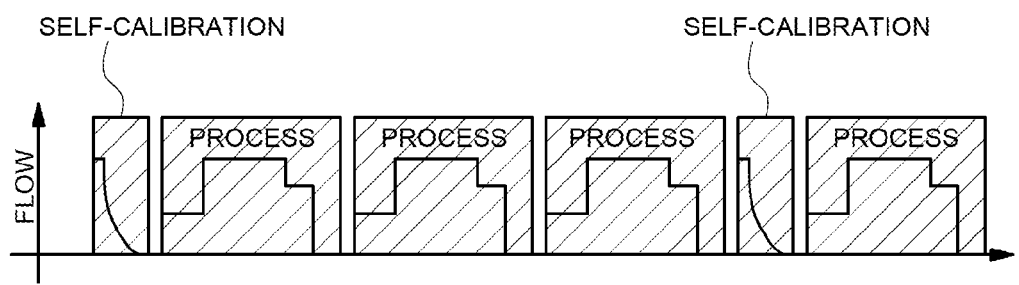
FIG. 5 is a timing chart illustrating an example of timing at which self-calibration is performed in the mass flow controller of the first embodiment.

To describe an example of a calibration result, as illustrated in a graph of FIG. 4, regarding pre-calibration flow rate accuracy, in the case where the flow rate value setting Qr is small, a large flow rate error occurs to bring flow rate accuracy into a low state, and across a fourth calibration interval, an occurrence direction of an error is reversed; however, in the case of using a post-calibration measured value using a calibration factor k calculated for each of the calibration intervals, as indicated by a polygonal line indicating post-calibration flow rate accuracy, substantially throughout the measurement range, the flow rate accuracy can be made uniform. This is because, as illustrated in the graph of FIG. 4, the calibration factor k is different for each of the calibration intervals, and therefore a calibration amount can be made different for each of the calibration intervals. In other words, by the conventional technique, only the offset correction can be made; however, according to the self-calibrating mechanism 100 of the first embodiment, a span correction centering around the fourth calibration interval can be achieved, and therefore the flow rate accuracy throughout the measurement range can be uniformly increased.

Finally, timing of the self-calibration by the self-calibrating mechanism 100 will now be described.

The flow rate controller 200 of the first embodiment is configured to perform the self-calibration in a state of being integrated with the gas panel system without separately preparing a flow rate sensor 3 for verification or calibration. As illustrated in a graph of FIG. 5, during a process period to perform flow rate control in order to manufacture actual products in a semiconductor manufacturing process, a suspension period exists. The self-calibrating mechanism 100 is adapted to perform the self-calibration during the suspension period, and during the subsequent process period, calibration factors k calculated on the basis of the self-calibration are used to output measured values, and also flow rate control based on the post-calibration measured values is performed.

As described, the flow rate controller 200 and self-calibrating mechanism 100 of the first embodiment are configured to, at the time of the self-calibration, divide the fluid parameter changing interval in which the flow rate of the fluid changes after the flow rate control valve 2 has been fully closed into the plurality of calibration intervals, obtain a calibrating volume Vc for each of the calibration intervals, and calculate a calibration factor k for each of the calibration intervals and therefore calibration depending on a flow rate error in each of the calibration intervals can be performed.

Accordingly, not by the calibration that offsets the entire measurement range with a single calibration factor k, but by making a calibration amount different for each of the calibration intervals throughout the measurement range of the flow rate sensor 3 as illustrated in the graph of FIG. 4, the uniform flow rate accuracy can be obtained throughout the measurement range.

Also, the first embodiment is configured to perform the self-calibration on the basis of the flow rate measured value Q outputted from the flow rate sensor 3 as a calibration target (verification target), so that without detaching the flow rate controller 200 from semiconductor manufacturing processing equipment, the self-calibration can be appropriately performed, and therefore over a long period of time, the flow rate accuracy of the flow rate controller 200 can be made to fall within an allowable flow rate accuracy range to extend a product life. Further, the self-calibration is appropriately performed, and therefore regarding the flow rate outputted from the flow rate controller 200 as well, reliability can be increased. In other words, the self-calibrating mechanism of the first embodiment enables a measured value thereof to be calibrated without using a reference sensor that separately measures a flow rate or pressure in the fluid parameter changing interval.

Further, the calibrating volume Vc calculated using the integrated value of the flow rate outputted from the flow rate sensor 3 is used, and therefore even in the case where a measured value outputted from the flow rate sensor 3 has noise, an influence of the noise can be reduced by an averaging effect. Accordingly, verification or calibration accuracy can be increased. In addition, in the case of using the calibrating volume Vc, it is only necessary to prepare only one reference volume Vs serving as a comparison target, and therefore time and effort to prepare a reference can be reduced.

Next, variations of the first embodiment will be described.

Figure 6:
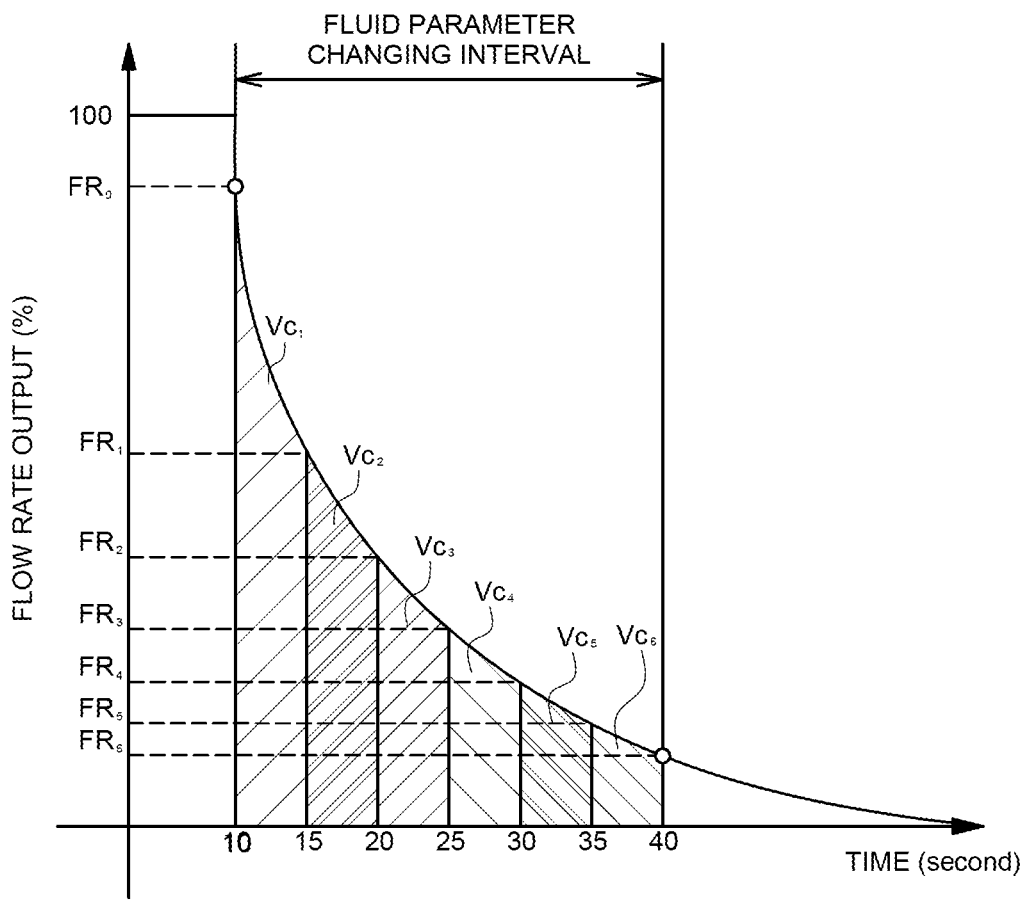
FIG. 6 is a schematic graph illustrating another mode in which the calibrating volume calculation part in a variation of the first embodiment divides the fluid parameter changing interval into a plurality of calibration intervals.

Each of the calibration intervals has values determined by measured values measured by the flow rate sensor 3; however, starting and ending points of each of the calibration intervals may be preset by an elapsed time after the flow rate control valve 2 has been fully closed. More specifically, as illustrated in FIG. 6, the present invention may be adapted to fix a period length of each of the calibration intervals, and determine flow rates at starting and ending points of each of the calibration intervals from times in an opposite manner.

In short, as a method for dividing the fluid parameter changing interval, without limitation to that described in the first embodiment, a suitable dividing method may be employed. For example, even in the case of determining the calibration intervals on the basis of measured values, the calibration intervals are not determined on the basis of equidistant measured values such as 10 to 20% and 20 to 30%, but measured value ranges corresponding to the respective calibration intervals may be different, such as 10 to 20% and 20 to 40%. As long as the dividing method is one that divides the fluid parameter changing interval into two or more calibration intervals to perform the verification and calibration, substantially the same effect as that of the first embodiment can be obtained.

Figure 7:
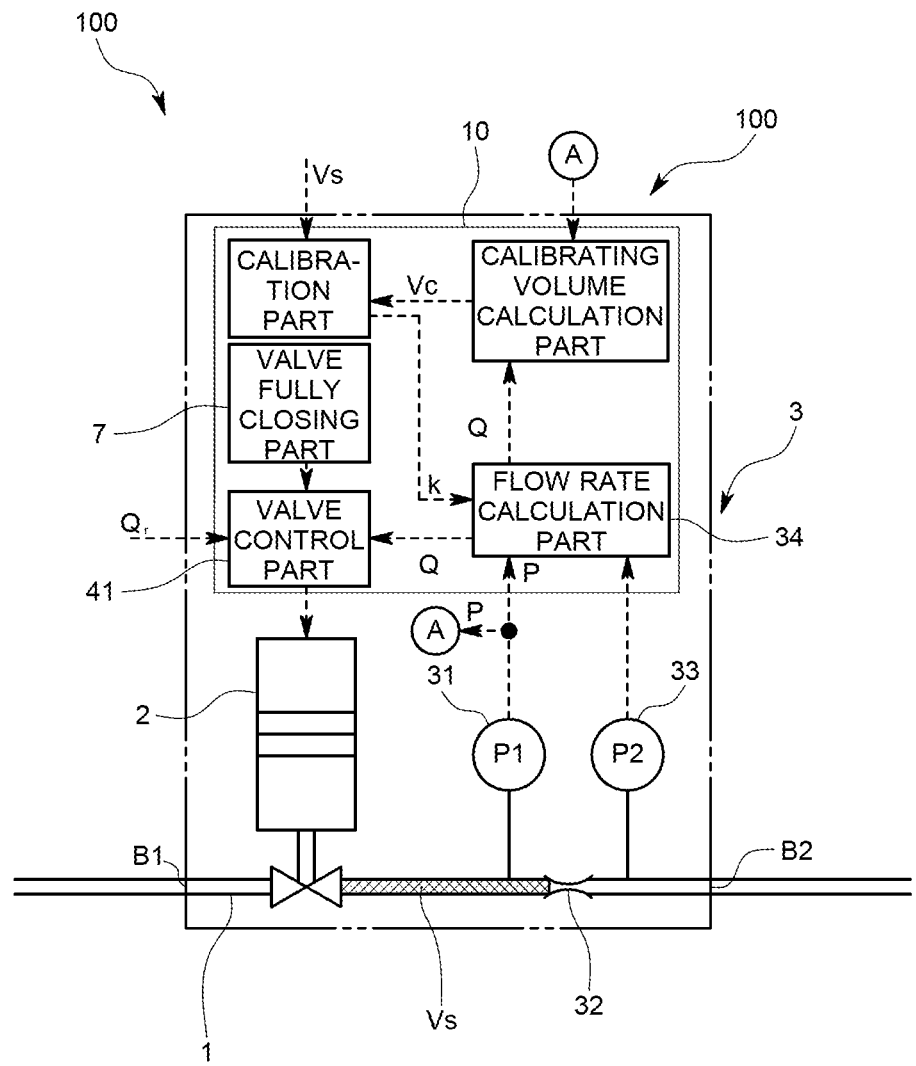
FIG. 7 includes a schematic fluid circuit diagram and functional block diagram illustrating calibration of a mass flow controller in a variation of the first embodiment.

Also, in the flow rate controller 200 of the first embodiment, on the downstream side of the fluid resistor 32, a pressure sensor is omitted; however, in the case where a change in pressure on the downstream side is not ignorable, as illustrated in FIG. 7, a pressure sensor 33 may be provided on the downstream side of the fluid resistor 32 as well. In this case, the flow rate calculation part 34 calculates the flow rate on the basis of outputs from the two pressure sensors 31 and 33, and the self-calibrating mechanism 100 performs the calibration with use of the pressure measured by the pressure sensor 31 that can measure the pressure of the reference volume Vs.

Next, a self-calibrating mechanism 100 of a second embodiment will now be described with reference to FIG. 8. Note that members other than a pressure sensor S1 and a flow rate sensor S2 in the second embodiment, which correspond to those in the first embodiment, are affixed with the same letters or numerals. In addition, the sensors affixed with the marks S1 and S2 refer to sensor irrelevant to flow rate control.

The self-calibrating mechanism (diagnostic mechanism) 100 of the second embodiment is not one that is configured as part of the flow rate controller 200 as with the first embodiment, but one that is configured as a single body of the self-calibrating mechanism 100, for example, in a gas panel system.

More specifically, the second embodiment is different from the first embodiment in being configured to fully close an on/off valve 21, which is different from the flow rate control valve 2 provided in the flow path 1, to perform self-calibration (verification), and make the reference volume (diagnostic volume) Vs include not only the flow path 1 but also a reference tank BT.

Figure 8:
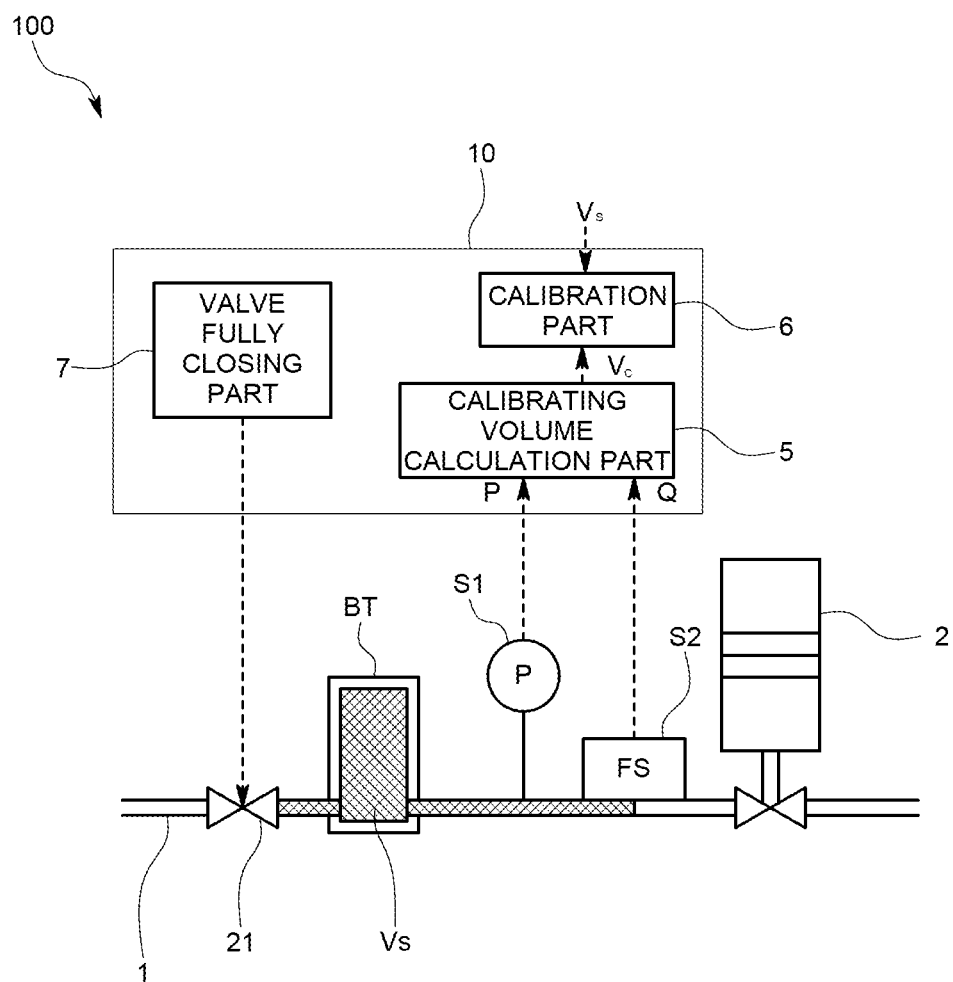
FIG. 8 includes a schematic fluid circuit diagram and functional block diagram illustrating a calibrating mechanism according to a second embodiment of the present invention.

That is, in the second embodiment, as illustrated in FIG. 8, in the flow path 1, from an upstream side, the on/off valve 21, reference tank BT, pressure sensor S1, flow rate sensor S2 as a calibration target (verification target), and flow rate control valve 2 are provided in this order, and the self-calibrating mechanism 100 is one that performs the verification or calibration on the basis of changes in fluid parameters, which are caused by the outflow of fluid present in a space from the on/off valve 21 to the flow rate sensor S2. Note that during performing the verification or calibration, the flow rate control valve 2 is adapted to be fully opened or kept constant at a predetermined opening level.

Even by such a mechanism, as with the self-calibrating mechanism 100 of the first embodiment, a measured value of the flow rate sensor S2 can be verified or calibrated. More specifically, as illustrated in graphs of FIG. 9, the self-calibrating mechanism 100 of the second embodiment can also calculate a value of the reference volume Vs for each calibration interval on the basis of values of the pressure sensor S1 and the flow rate sensor S2, and perform the verification or calibration by the calibration part 6. In the case where the valve to be fully closed is present on an upstream side of the flow rate sensor S2 as the calibration target (verification target), as the flow rate decreases, the pressure is also decreased.

Figure 9:
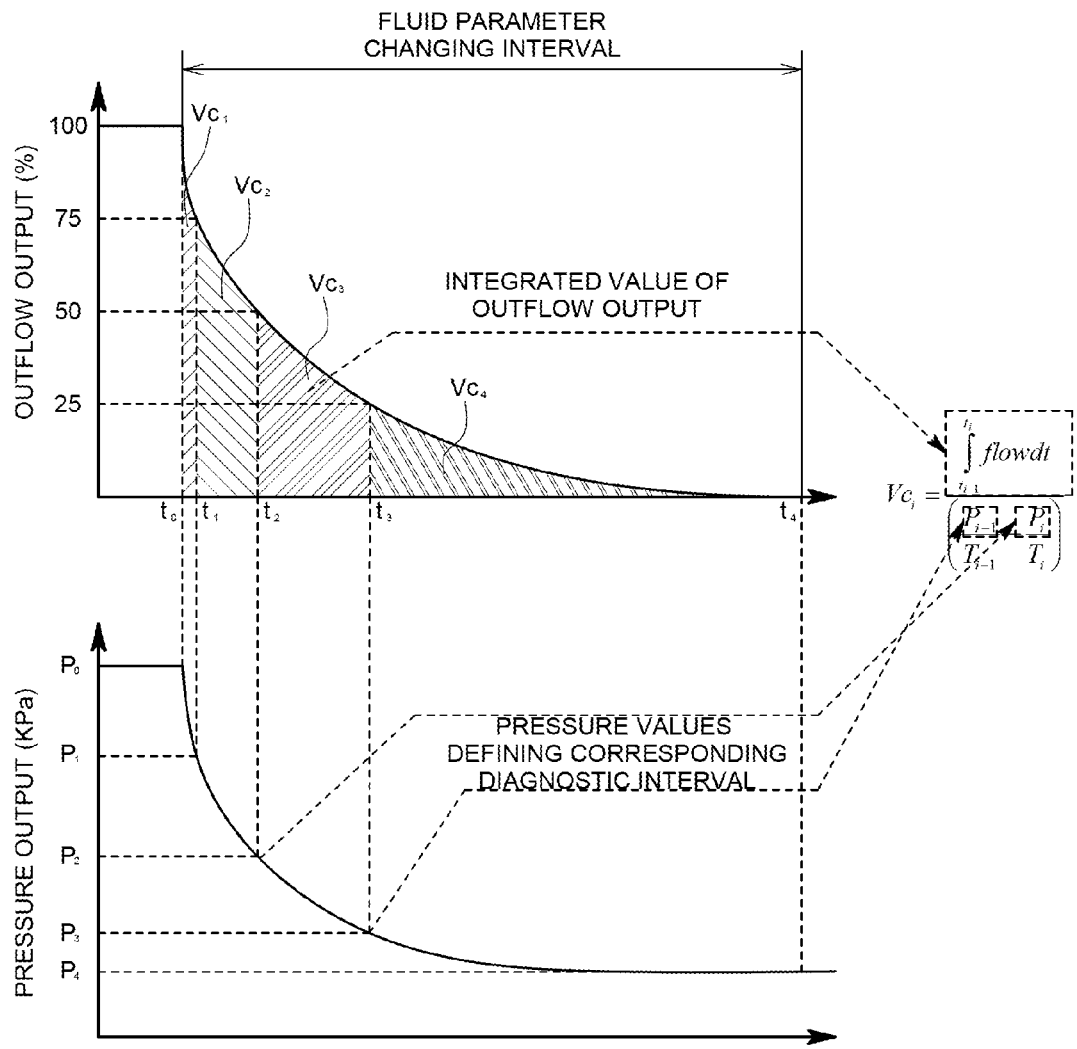
FIG. 9 includes schematic graphs respectively illustrating examples of flow rate and pressure changing modes in a fluid parameter changing interval in the second embodiment.

A variation of the second embodiment will now be described. For example, the present invention may be adapted such that not only on the upstream side of the reference tank BT, but also on a downstream side of the reference tank BT, and between the reference tank BT and the flow rate sensor S2, one more downstream side on/off valve is further provided, and the valve fully closing part 7 first brings the upstream side on/off valve 21 into an opened state as well as bringing the downstream side on/off valve into a fully closed state to store a sufficient amount of fluid in the reference tank BT, and then fully closes the on/off valve 21 on the upstream side of the reference tank BT as well as bringing the downstream side on/off valve into an opened state to perform measurement by the flow rate sensor S2 in a fluid parameter changing interval. Even with such a configuration, it is possible to change the downstream side on/off valve from the fully closed state to the opened state, and as illustrated in the graphs of FIG. 9, produce the fluid parameter changing interval in which the changes in flow rate and pressure occur, and therefore the flow rate sensor S2 can be calibrated in the same manner. Further, the present invention may be adapted to omit the on/off valve 21 present on the upstream side of the reference tank BT, and change the above-described on/off valve present on the downstream side of the reference tank BT from the fully closed state to the opened state to thereby produce the fluid parameter changing interval.

Figure 10:
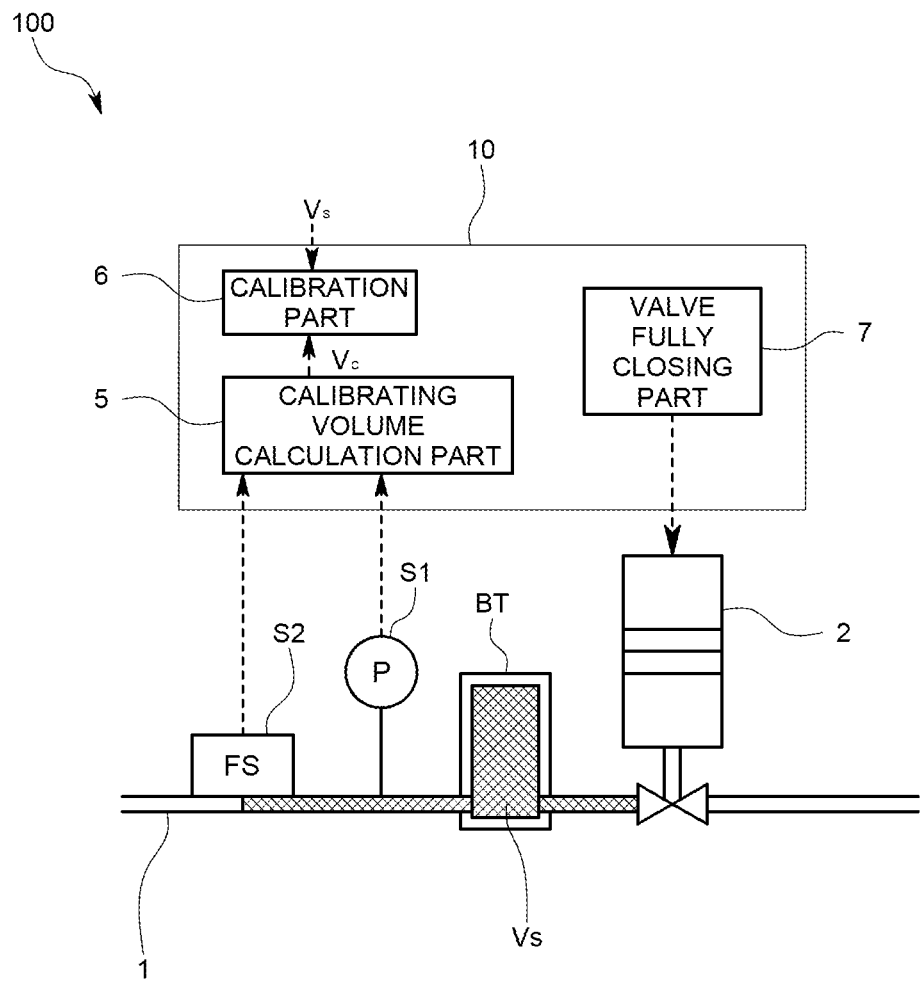
FIG. 10 includes a schematic fluid circuit diagram and functional block diagram illustrating a calibrating mechanism according to a third embodiment of the present invention.

Next, a self-calibrating mechanism (diagnostic mechanism) 100 of a third embodiment will now be described with reference to FIG. 10. The self-calibrating mechanism 100 of the third embodiment is different from the self-calibrating mechanism 100 of the second embodiment in that in a flow path 1, from an upstream side, a flow rate sensor S2, pressure sensor S1, reference tank BT, and flow rate control valve 2 are provided, and the flow rate control valve 2 present on a downstream side of the flow rate sensor S2 as a verification target is fully closed.

Figure 11:
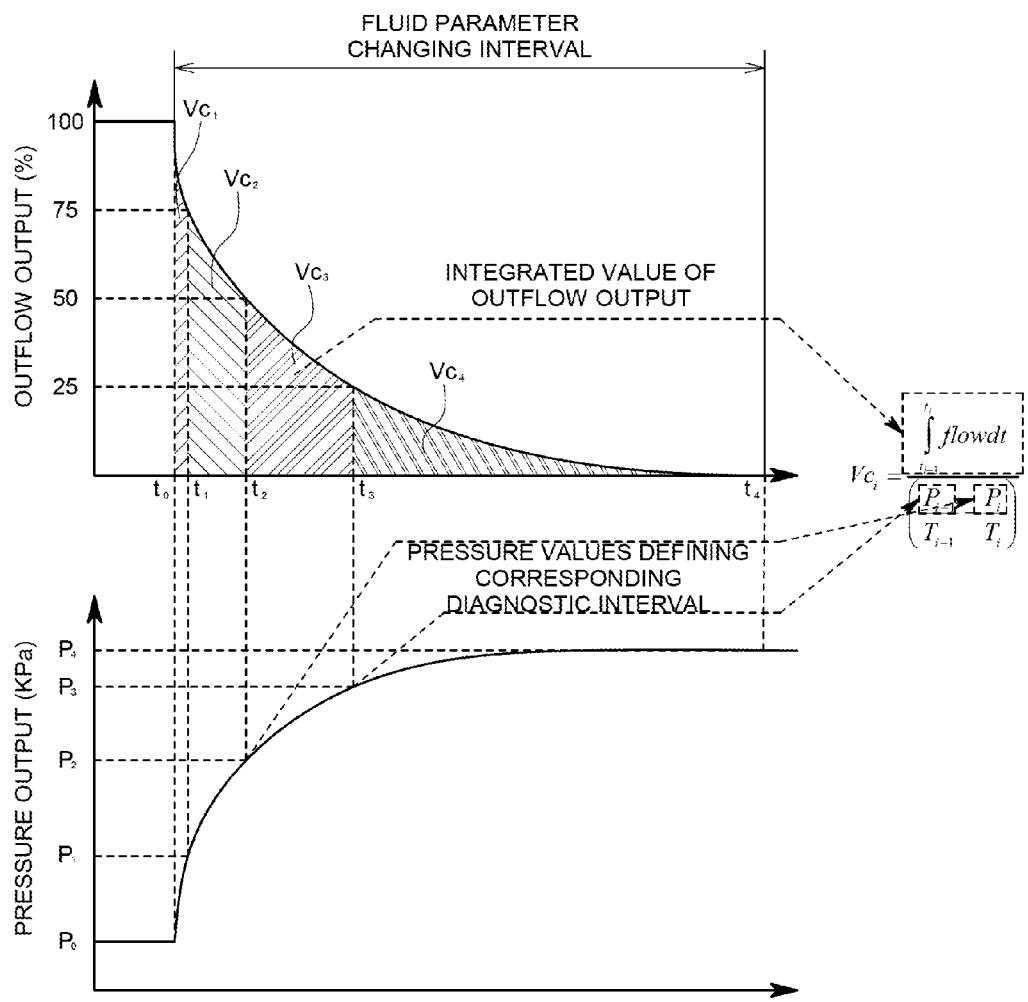
FIG. 11 includes schematic graphs respectively illustrating examples of flow rate and pressure changing modes in a fluid parameter changing interval in the third embodiment.

In the case of such a configuration, as illustrated in graphs of FIG. 11, as a flow rate decreases after the flow rate control valve 2 has been fully closed, a pressure measured by the pressure sensor S1 is increased. Even in the case where such changes in fluid parameters occur, by the same technique as those in the first and second embodiments, a calibrating volume (diagnostic volume) can be calculated to perform verification or calibration of a measured value on the basis of a comparison with a reference volume.

Next, a diagnostic mechanism (self-calibrating mechanism) 100 of a fourth embodiment will now be described with reference to FIG. 12. The diagnostic mechanism 100 of the fourth embodiment is not one constituting part of a flow rate controller 200, but one constituting part of a pressure controller 300. Further, the diagnostic mechanism 100 of the fourth embodiment is not one that performs verification or calibration of a flow rate measured value Q, but one that performs verification or calibration of a pressure measured value P for each diagnostic interval (calibration interval).

Figure 12:
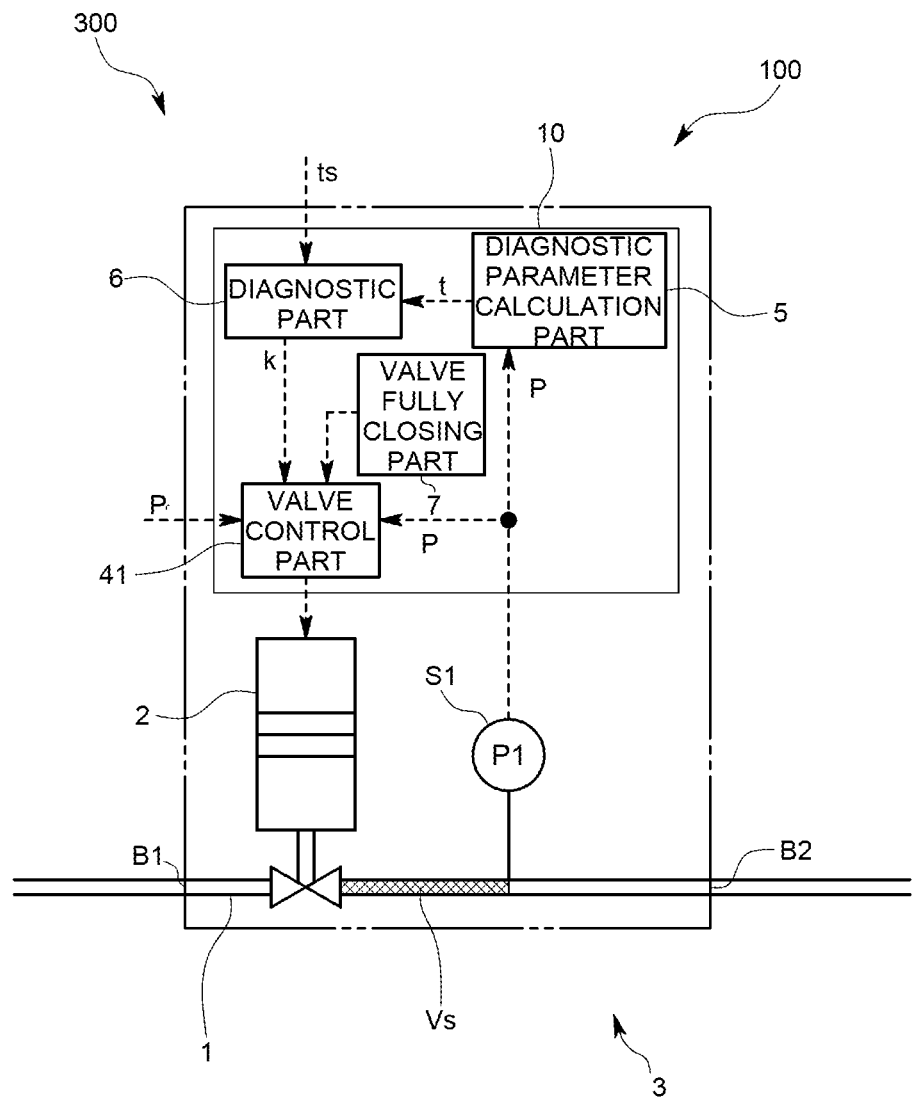
FIG. 12 includes a schematic fluid circuit diagram and functional block diagram illustrating a pressure controller provided with a self-calibrating mechanism according to a fourth embodiment of the present invention.

More specifically, a pressure control mechanism in the pressure controller 300 of the fourth embodiment is one that is, as illustrated in FIG. 12, in a flow path 1 formed in a board block B, from an upstream side, provided with a pressure control valve 2 and a pressure sensor S1 in this order, and a valve control part 41 is configured to control an opening level of the pressure control valve 2 so as to minimize a deviation between a measured value outputted from the pressure sensor S1 and a preset pressure value setting.

In each of the first to third embodiments, the calibrating volume Vc and the reference volume Vs are used to perform the verification or calibration; however, the diagnostic mechanism 100 constituting the part of the pressure controller 300 of the fourth embodiment is different from any of the first to third embodiments in calculating and using a various types of parameters and diagnostic parameter used in a diagnostic parameter calculation part (calibrating volume calculation part) 5 and a diagnostic part (calibration part) 6.

That is, the diagnostic parameter calculation part 5 is configured to divide a fluid parameter changing interval into a plurality of diagnostic intervals on the basis of measured values outputted from the pressure sensor S1 as a verification target (calibration target), and also calculate a diagnostic parameter for each of the diagnostic intervals only with a pressure measured value P.

Figure 13:
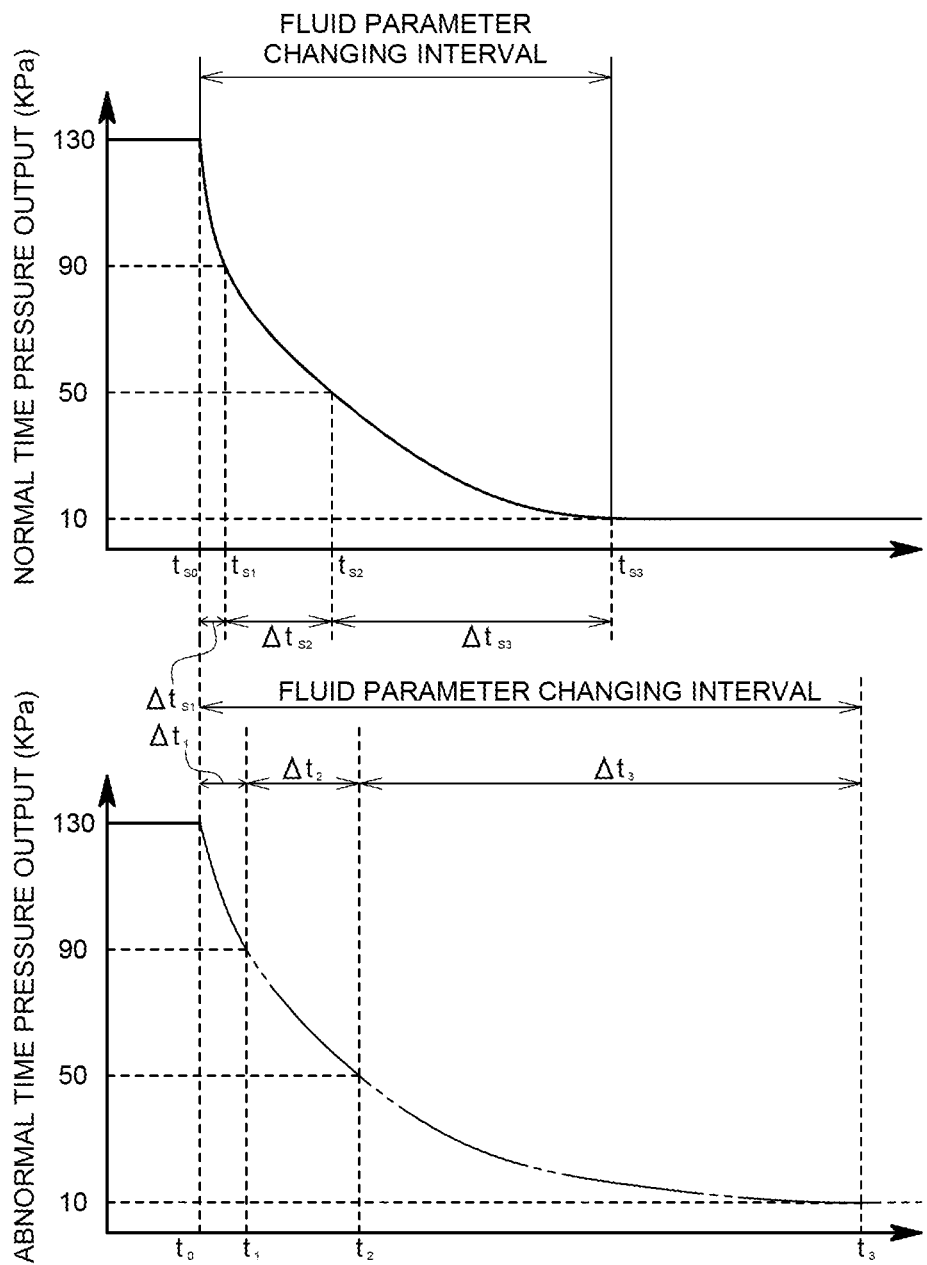
FIG. 13 includes schematic graphs illustrating a diagnostic period length and a reference period length that are a diagnostic parameter and a reference parameter in each diagnostic interval in the fourth embodiment.

More specifically, the fourth embodiment is, as illustrated in a graph of FIG. 13, configured to, as starting and ending points of each of the diagnostic intervals, set points at which measured values outputted from the pressure sensor S1 become equal to preset values, respectively, and adapted to divide the fluid parameter changing interval into three diagnostic intervals corresponding to 10 to 50 KPa, 50 to 90 KPa, and 90 to 130 KPa.

Also, the diagnostic parameter calculation part 5 is adapted to, as the diagnostic parameter, output an interval length calculated from times of starting and ending points at which pressure values prescribing each of the diagnostic intervals are reached. That is, in the fourth embodiment, the diagnostic parameter is a diagnostic interval length $\Delta t$ that is an interval length of each of the diagnostic intervals, and as a reference parameter used in the diagnostic part 6, a reference interval length $\Delta t_s$ that is a diagnostic interval length $\Delta t$ calculated when the pressure sensor S1 is normal is used.

More specifically, as the reference interval length $\Delta t_s$ used in the diagnostic part 6, as illustrated in FIG. 13, a different value is used for each of the diagnostic intervals. Also, the diagnostic part 6 is adapted to, on the basis of whether or not a difference or ratio between the diagnostic interval length $\Delta t$ and the reference interval length $\Delta t_s$ is equal to or more than a predetermined value, verify which diagnostic interval causes a problem in a pressure measured value P.

Further, the diagnostic part 6 is configured to, as a calibration factor k, output a value obtained by dividing the reference interval length $\Delta t_s$ by the diagnostic interval length $\Delta t$, and the valve control part 41 is configured to multiply the pressure measured value P obtained from the pressure sensor S1 by the calibration factor k and then use the resultant value for pressure control.

Thus, as described in the fourth embodiment, the diagnostic mechanism 100 of the present invention can also be, without limitation to the flow rate controller 200, applied to the pressure controller 300. Also, as the diagnostic parameter, with use of not the calibrating volume Vc but also a length of each of the diagnostic intervals, the verification or calibration can be preferably performed for each of the diagnostic intervals. Note that the use of an interval length of each of the diagnostic intervals as the diagnostic parameter can also be, without limitation to the case of setting the pressure measured value P as a verification target, equally applied to the case of setting the flow rate measured value Q as a verification target. Also, a way to define a period length may be one that, for example, represents the period length by a difference between time when the valve is fully closed and an ending point of a corresponding diagnostic interval.

Other embodiments will now be described.

Figure 14:
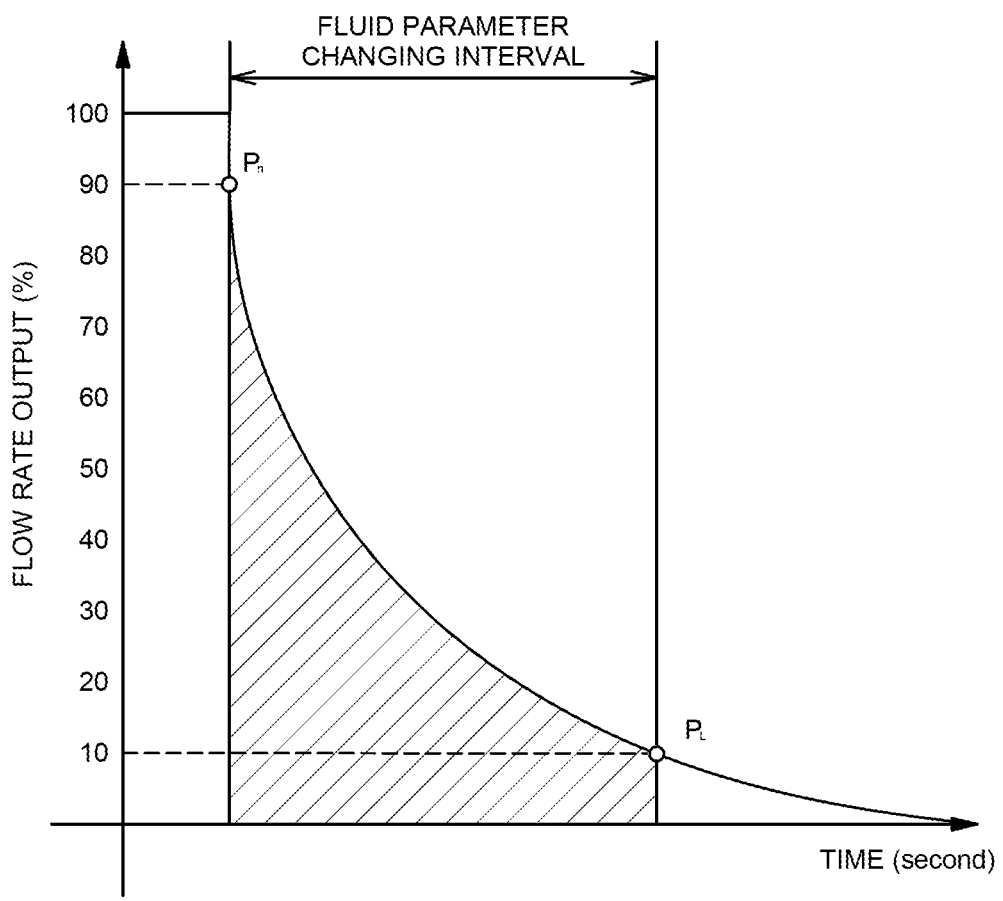
FIG. 14 is a schematic graph illustrating a target interval for calculating a diagnostic volume in a conventional calibrating mechanism.

In each of the above-described embodiments, the diagnostic part is one that performs both of the verification and the calibration; however, the diagnostic part may be configured to perform only any one of them. The calibration part is configured to, for each of the plurality of calibration intervals, output a value obtained by dividing the reference volume by a calibrating volume as a calibration factor; however, for example, the present invention may be configured to output a calibration factor only for an interval that is verified in the verification that a measured value has abnormality. Further, without limitation to only the aspect in which the fluid parameter changing interval is divided into the plurality of calibration intervals, this calibrating method can also be applied to the case where the fluid parameter changing interval is not divided, and the whole of the fluid parameter changing interval is treated as one calibration interval. That is, the present invention may set a calibration interval as illustrated in FIG. 14 to make the calibration part calculate the calibration factor from a calibrating volume and the reference volume.

Also, a format of the calibration factor calculated by the calibration part is not limited to that described in each of the embodiments. For example, the calibration part may calculate a calibration factor from an absolute value of a difference between a calibrating volume and the reference volume. Also, each of the embodiments is adapted to multiply a measured value of the flow rate sensor by a calibration factor to perform the calibration; however, the present invention may be, in a situation such as a situation where flow rate control is stable, and a flow rate value setting and a measured value of the flow rate sensor substantially coincide with each other, multiply the flow rate value setting by a calibration factor to set the resultant value as a calibrated measured value.

As described in each of the embodiments, the array order of the fluid devices can be appropriately changed. In short, as long as a sensor serving as a verification target is configured to be able to measure a fluid parameter of the fluid in the reference volume, a position of the sensor in the order is not particularly limited.

As a measurement principle of the flow rate sensor, in each of the above-described embodiments, a differential pressure type (pressure type) is described; however, the present invention can also be applied in the same way even in the case of a flow rate sensor based on a thermal type measurement principle.

Further, by installing a program for configuring the calibrating volume calculation part and calibration part of the present invention in existing flow rate and pressure controllers or the like, the functions of the present invention can also be added by retrofitting.

In addition, each of the above-described embodiments is configured to calculate a calibration factor on the basis of a calibrating volume calculated from an integrated value of a flow rate measured by the flow rate sensor; however, the present invention may calculate a calibration factor on the basis of a flow rate integrated value at the normal time and a current flow rate integrated value both of which are calculated for the same calibration interval. More specifically, the present invention may be configured to, in place of the calibrating volume calculation part, use a calibrating parameter calculation part that calculates integrated values themselves of a flow rate measured by the flow rate sensor in at least some intervals of the fluid parameter changing interval, and also on the basis of the flow rate integrated values calculated in the calibrating parameter calculation part and the reference flow rate integrated value, make the calibration part calculate calibration factors.

Besides, unless against the scope of the present invention, various modifications and combinations of the respective embodiments may be made.

The invention claimed is:

1. A diagnostic mechanism that verifies or calibrates a measured value of a fluid sensor that measures a flow rate or a pressure of fluid flowing through a flow path, the diagnostic mechanism comprising:
a valve fully closing part that outputs a fully closing signal for fully closing a valve provided in the flow path;
a diagnostic parameter calculation part that divides, into a plurality of diagnostic intervals, a fluid parameter changing interval in which the valve is in a state of being kept in a fully closed state or in a state of being changed from the fully closed state to an opened state, and the flow rate or the pressure of the fluid flowing through the flow path changes with time, and also on a basis of a flow rate or pressure measured value outputted from the fluid sensor in each of the diagnostic intervals, calculates a corresponding diagnostic parameter for each of the respective diagnostic intervals; and
a diagnostic part that, on a basis of each of the diagnostic parameters calculated for the respective diagnostic intervals and at least one preset reference parameter, verifies or calibrates the flow rate or pressure measured value outputted by the fluid sensor in the diagnostic interval.

2. The diagnostic mechanism according to claim 1, wherein
a starting point and an ending point of each of the diagnostic intervals are set on a basis of flow rate or pressure measured values outputted from the fluid sensor.

3. The diagnostic mechanism according to claim 1, wherein:
each of the diagnostic parameters for the respective diagnostic intervals is a diagnostic volume that is calculated on a basis of an integrated value of the flow rate of the fluid flowing through the flow path; and
the at least one reference parameter is a preset reference volume, and the reference volume is a diagnostic volume that is calculated by the diagnostic parameter calculation part when the fluid sensor is normal.

4. The diagnostic mechanism according to claim 1, wherein:
each of the diagnostic parameters is a respective diagnostic period length that corresponds to a period length of a respective diagnostic interval calculated on a basis of a starting point and an ending point of the respective diagnostic interval; and
the at least one preset reference parameter is one of a plurality of preset reference parameters, wherein each of the preset reference parameters is a corresponding reference period length that is preset for the respective diagnostic interval, and each of the reference period lengths is a respective diagnostic period length that is calculated for the respective diagnostic interval by the diagnostic parameter calculation part when the fluid sensor is normal.

5. The diagnostic mechanism according to claim 1, wherein
the diagnostic part is configured to compare each of the diagnostic parameters and at least one reference parameter with each other for each of the diagnostic intervals, and verify which diagnostic interval causes a measured value outputted from the fluid sensor to have abnormality.

6. The diagnostic mechanism according to claim 1, wherein
the diagnostic part is configured to, for the respective diagnostic intervals, calculate each of a plurality of calibration factors on a basis of each of the diagnostic parameters and the at least one reference parameter.

7. A mass flow controller comprising the diagnostic mechanism according to claim 1.

8. A diagnostic method that verifies or calibrates a measured value of a fluid sensor that measures a flow rate or a pressure of fluid flowing through a flow path, the diagnostic method comprising:
a valve fully closing step of outputting a fully closing signal for fully closing a valve provided in the flow path;
a diagnostic parameter calculation step of dividing, into a plurality of diagnostic intervals, a fluid parameter changing interval in which the valve is in a state of being kept in a fully closed state or in a state of being changed from the fully closed state to an opened state, and the flow rate or the pressure of the fluid flowing through the flow path changes with time, and also on a basis of a flow rate or pressure measured value outputted from the fluid sensor in each of the diagnostic intervals, calculating each of a plurality of diagnostic parameters for the respective diagnostic intervals; and a diagnostic step of, on a basis of the diagnostic parameter calculated for the respective diagnostic intervals, and at least one preset reference parameter, verifying or calibrating the flow rate or pressure measured value outputted by the fluid sensor in the diagnostic interval.

* * * * *